(12) United States Patent
Meyer (10) Patent No.: US 11,476,914 B2
(45) Date of Patent: Oct. 18, 2022

(54) MASSIVE MIMO ANTENNA AND METHOD FOR OPERATING A MASSIVE MIMO ANTENNA

(71) Applicant: XILINX, INC., San Jose, CA (US)

(72) Inventor: Peter Meyer, Dresden (DE)

(73) Assignee: XILINX, INC., San Jose, CA (US)

( * ) Notice: Subject to any disclaimer, the term of this patent is extended or adjusted under 35 U.S.C. 154(b) by 2 days.

(21) Appl. No.: 17/257,141

(22) PCT Filed: Apr. 15, 2019

(86) PCT No.: PCT/EP2019/059664
§ 371 (c)(1),
(2) Date: Dec. 30, 2020

(87) PCT Pub. No.: WO2020/020497
PCT Pub. Date: Jan. 30, 2020

(65) Prior Publication Data
US 2021/0184745 A1  Jun. 17, 2021

(30) Foreign Application Priority Data
Jul. 27, 2018 (EP) ..................................... 18185986

(51) Int. Cl.
| | | |
|---|---|---|
| *H04B 7/06* | (2006.01) | |
| *H01Q 3/24* | (2006.01) | |
| *H04B 7/0413* | (2017.01) | |
| *H04B 7/08* | (2006.01) | |

(52) U.S. Cl.
CPC ............ *H04B 7/0693* (2013.01); *H01Q 3/24* (2013.01); *H04B 7/0413* (2013.01); *H04B 7/0877* (2013.01)

(58) Field of Classification Search
CPC .. H04B 7/0693; H04B 7/0413; H04B 7/0877; H01Q 3/24
See application file for complete search history.

(56) References Cited

U.S. PATENT DOCUMENTS

2009/0231197 A1* 9/2009 Richards .............. H01Q 3/2682
342/377
2019/0036587 A1* 1/2019 Nilsson .................... H01Q 3/24

FOREIGN PATENT DOCUMENTS

WO 2017129225 A1 8/2017

OTHER PUBLICATIONS

International Search Report adn Written Opinion for PCT/EP2019/059664 dated Aug. 29, 2019.

* cited by examiner

*Primary Examiner* — Sung S Ahn
(74) *Attorney, Agent, or Firm* — Patterson + Sheridan, LLP (57) ABSTRACT

The present invention provides a massive MIMO antenna for wireless communication, the massive MIMO antenna comprising a plurality of antenna elements configured to receive upstream wireless signals and to transmit downstream wireless signals, the antenna elements being arranged in a matrix-like arrangement comprising rows and/or columns of antenna elements, a plurality of transceivers, each coupled to at least one of the antenna elements, and a control unit configured to selectively activate and/or deactivate specific ones of the transceivers. In addition, the present invention provides a respective method for operating a massive MIMO antenna.

17 Claims, 7 Drawing Sheets

MASSIVE MIMO ANTENNA AND METHOD FOR OPERATING A MASSIVE MIMO ANTENNA

TECHNICAL FIELD

The invention relates to a massive multiple-input, multiple-output (MIMO) antenna and to a method for operating a massive MIMO antenna.

BACKGROUND

Although applicable to any antenna with multiple antenna elements, the present invention will mainly be described in conjunction with massive MIMO antennas for cell-based telecommunication systems.

Today wireless communication networks are widely used for providing voice and data communication to users. Such wireless communication networks, like e.g. LTE based or so-called 4G networks, usually comprise a core network and a so-called radio access network or RAN. It is understood, that each of these interrelated networks may comprise a plurality of different elements, modules or units that together provide the required communication capabilities.

As part of the RAN so called eNodeBs or base stations provide the link between the operator's network and the users mobile devices or user equipments (UEs). Usually the eNodeBs will comprise antennas that serve for transmitting outgoing signals to the UEs and for receiving incoming signals from the UEs. Up to now, most commonly passive or active antennas with fixed radiation patterns are used.

However, in the future, especially in modern 5G-Networks, such conventional antennas may be replaced by massive MIMO antennas (antennas with a plurality of single antenna elements that may form and steer a plurality of beams at the same time).

In a massive MIMO or active antenna as used for massive MIMO communication systems usually every single antenna element or small groups of antenna elements are each provided with a dedicated receiver and transmitter unit, also called a transceiver. These transceivers further usually comprise or are connected to a radio front end consisting of related filters, switches and a respective amplifier. Especially the power amplifiers consume a huge amount of electrical power. In addition, the transceivers are usually also connected digitally to a unit that combines all received signals into a single signal. The same unit also splits outgoing signals towards the transceivers for transmitting respective signals.

During normal operation, the complete massive MIMO antenna runs actively all the time, regardless of the surrounding traffic. This is necessary because the antenna must always listen to incoming calls or requests and transmit broadcasting information. However, such a massive MIMO antenna may have a high power consumption.

Accordingly, there is a need for antennas with reduced power requirements.

SUMMARY OF THE INVENTION

The above stated problem is solved by the features of the independent claims. It is understood, that independent claims of a claim category may be formed in analogy to the dependent claims of another claim category.

Accordingly, it is provided:

A massive MIMO antenna for wireless communication, the massive MIMO antenna comprising a plurality, i.e. at least two, of antenna elements configured to receive upstream wireless signals and to transmit downstream wireless signals, e.g. from a mobile device or UE (User Equipment), the antenna elements being arranged in a matrix-like arrangement comprising rows and/or columns of antenna elements, a plurality, i.e. at least two, but especially not more than the number of antenna elements, of transceivers, each coupled to at least one of the antenna elements, and a control unit configured to selectively activate and/or deactivate specific ones of the transceivers.

Further, it is provided:

A method for operating a massive MIMO antenna according to the present invention. The method comprises initiating operation of a plurality of transceivers, each transceiver being coupled to at least one antenna element of a plurality of antenna elements configured to receive upstream wireless signals and to transmit downstream wireless signals, the antenna elements being arranged in a matrix-like arrangement comprising rows and/or columns of antenna elements, and during operation of the transceivers selectively activating and/or deactivating specific ones of the transceivers.

The present invention is based on the finding, that permanently operating a massive MIMO antenna with all antenna elements active, consumes more power than may be needed. For example, there may be times that do not require a cell of a communication system to provide the maximum possible capacity. For example, a cell that supplies an urban area with office buildings with communication services may not be required to provide the full capacity during the night, or a cell supplying a residential area may not be required to provide full capacity during working hours, when the residents are not at home.

The present invention therefore provides a massive MIMO antenna that may adaptively be configured to provide the full communication capabilities or only limited communication capabilities, as currently required.

To this end, the present invention provides the massive MIMO antenna with a plurality of antenna elements that are arranged in rows and columns, i.e. in a matrix-like arrangement. Such an arrangement may just exemplarily comprise 8×8 antenna elements, i.e. 64 antenna elements. In such a massive MIMO antenna a single transceiver may be provided for every antenna element. It is however also possible, that e.g. two or more antenna elements are coupled to the same transceiver. The term "transceiver" in this case may refer to a single integrated element comprising a transmitter and a receiver. The term "transceiver" may however also refer to two dedicated devices, i.e. a transmitter and a receiver. If more than one antenna elements are coupled to a single transceiver, for example neighboring antenna elements of a row or column may be coupled to the same transceiver. Further, the term "transceiver" may also refer to additional elements, like required filters, amplifiers and the like, that are provided for single antenna elements or groups of antenna elements.

With the control unit of the massive MIMO antenna it is now possible, to selectively control single transceivers to be active or inactive. This for example allows deactivating the transceivers that are coupled to the antenna elements of a single row or column of the matrix like arrangement. For example, in the above mentioned exemplary 8×8 massive MIMO antenna, the matrix-like arrangement comprises 8 rows and 8 columns of antenna elements, that during normal operation serve for performing wireless communication using beamforming.

However, as mentioned above, there may be times during which the full communication capacity is not required.

During such times, the control unit may therefore deactivate at least some of the transceivers, e.g. for single rows or columns of antenna elements. This deactivation will on the one hand reduce capacity of the massive MIMO antenna, and on the other hand also the power consumption of the massive MIMO antenna. Since the full communication capacity is not required during such times, the reduced capacity is acceptable.

Reducing the power consumption not only protects the environment and reduces operating costs. Reducing the power consumption also reduces the amount of heat that is produced in the massive MIMO antenna, especially by the amplifiers. Further, it is known that the life time of an electronic device usually depends on its operating time. Deactivating single transceivers will reduce their operating time. Consequently, deactivating transceivers in intervals will also increase their life span or the mean time between failures (MTBF) of the massive MIMO antenna.

In the following, the present invention will mainly be described with selectively activating and deactivating columns of antenna elements, i.e. with massive MIMO antennas that provide at least horizontal beamforming. It is however understood, that ever respective explanation may also be applied to activating and deactivating rows of antenna elements. It is further understood, that the terms massive MIMO antenna and active antenna may be used interchangeably. Further, if in the following it is stated, that an antenna element is deactivated, it is understood, that the respective transceiver is deactivated.

Further embodiments of the present invention are subject of the further subclaims and of the following description, referring to the drawings.

In an embodiment, the control unit may be configured to selectively activate and/or deactivate in groups the transceivers that are coupled to the antenna elements of a specific row and/or column of the matrix-like arrangement.

Activating groups of transceivers that are coupled to rows or columns of antenna elements in the matrix-like arrangement, allows for example activating only a single column or row of the massive MIMO antenna for communication.

In this case, the massive MIMO antenna will operate like a traditional non-active antenna. Therefore, the massive MIMO antenna will still illuminate a complete cell of a communication system but using a broader single beam. In this configuration, the massive MIMO antenna will provide the same capacity to the cell as a conventional non-active antenna.

In a further embodiment, the control unit may be configured to selectively activate and/or deactivate the transceivers based on a load condition of the massive MIMO antenna.

The term "load condition" of the massive MIMO antenna refers to the amount of traffic in a cell that is served by the massive MIMO antenna. With a low load condition, the beam forming capabilities of the massive MIMO antenna may not be required to communicate with all devices, e.g. UEs, in the respective cell. Therefore, the control unit may e.g. deactivate at least some, e.g. all but one of the columns of antenna elements of the massive MIMO antenna.

In another embodiment, the control unit may be configured to gradually determine the number of selectively activated and/or deactivated transceivers based on a load condition of the massive MIMO antenna.

As explained above, all but one column of antenna elements of a massive MIMO antenna may be deactivated, if only low communication capacity is required in the respective cell.

However, there may be a requirement for a communication capacity that is lower than the maximum communication capacity but still higher than the communication capacity that may be provided with a single column of antenna elements.

In such cases, the control unit may gradually reduce the number of active columns of antenna elements according to the required communication capacity. For example, an 8×8 massive MIMO antenna may operate as a 4×8 massive MIMO antenna, i.e. with only four active columns of antenna elements. It is understood, that the control unit may also deactivate rows and columns of antenna elements at the same time. The 8×8 massive MIMO antenna may therefore also be operated e.g. as a 4×4, 6×4, 4×6, 2×4 massive MIMO antenna or the like. Any combination of columns and rows is possible.

In a further embodiment, the control unit may comprise a control interface that is configured to receive activation information and to selectively activate and/or deactivate the transceivers based on the activation information.

The massive MIMO antenna may e.g. be connected to a base band unit (BBU). The BBU may in such an arrangement control the massive MIMO antenna and may run the higher-level layers of the corresponding communication protocol stack. The BBU may e.g. be connected to the network of the operator of the respective network. The BBU by running the higher-level layers of the corresponding communication protocol stack usually has knowledge about the traffic in the cell it is serving. Therefore, the BBU may detect that there is temporary no traffic or very low traffic and transfer this information or respective control or activation information to the control unit of the active antenna via the control interface. The control unit may then appropriately select the transceivers that should be active and switch off all other transceivers.

The BBU may for example inform the control unit about very low traffic in the cell. In this case, the control unit may deactivate all but one column of antenna elements. The BBU may however also detect traffic in a range between the low traffic and maximum possible traffic. In this case, the BBU may inform the control unit accordingly. The control unit may therefore select a subset of e.g. 4 columns of antenna elements to accommodate the medium traffic with significantly reduced power consumption.

It is understood, that the BBU is just used as an exemplary device, and that any other unit may be coupled to the control interface and provide the respective information.

The control interface may e.g. be a CPRI or X-RAN interface, or any other type of adequate interface that may transfer the required information.

In another embodiment, the control unit may be configured to determine a load information for the massive MIMO antenna and to selectively activate and/or deactivate the transceivers based on the determined load information.

Instead of being coupled to an external device, like e.g. the above mentioned BBU, the massive MIMO antenna, i.e. the control unit, may also be capable to determine the load of the cell that is supplied by the massive MIMO antenna by itself. In this case, the control unit may e.g. accommodate at least part of the BBU or the respective functions of the BBU.

In a further embodiment, the control unit may comprise at least one temperature sensor configured to measure a temperature inside of the massive MIMO antenna, and the control unit may be configured to selectively activate and/or deactivate the transceivers based on the measured temperature.

Under extreme weather conditions, like e.g. a high ambient temperature, without any wind, the massive MIMO antenna may get so hot, that it can no longer operate without being damaged. Therefore, the temperature inside of the massive MIMO antenna may be monitored with a number of temperature sensors.

If the control unit detects a critical temperature, the control unit may for example shut down or deactivate a respective number of transceivers.

The control unit may e.g. gradually deactivate a respective number of antenna elements, e.g. column or row wise or in a mix of columns and rows. For example, the control unit may deactivate half the columns or go back to operate the massive MIMO antenna with only one column. In this case, the heat created by the active elements, especially the amplifiers, in the massive MIMO antenna will be reduced and the massive MIMO antenna may still operate safely. Coverage and traffic will still be provided, however, with reduced capacity.

The temperature sensors may e.g. be located close to the transceivers of the massive MIMO antenna. If the temperature reaches a critical level, the control unit may further report this via the control interface, e.g. to a BBU. The BBU may then decide to switch off a number of antenna elements as described above via the control interface to reduce power consumption and therefore the created heat. Further, the control unit may report the result of the heat reduction back to the BBU. Transferring the heat information to the BBU allows the BBU to forward this information to the network operator. The network operator may then take respective measures in the long term, e.g. provide a different cooling system to the massive MIMO antenna.

In another embodiment, the control unit may be configured to store the operating time of the single transceivers, e.g. in a memory, and to selectively activate and/or deactivate the transceivers based on the stored operating time, especially in order to balance the operating times of the single transceivers.

As already indicated above, the lifetime of an electronic component depends strongly on its operating time, i.e. the time that the component is active. Therefore, to increase the lifetime of the single electronic components of the massive MIMO antenna, especially the transceivers, the control unit may evenly distribute or balance the operating time of the single electronic elements in the massive MIMO antenna.

Therefore, when deactivating single transceivers, the control unit may decide which transceiver to deactivate based on the operation time of the single transceivers. Just as an example, in the case of only a single column of antenna elements being operated at a time, the control unit may cyclically change the column of active antenna elements in a predetermined time interval, e.g. minutes, hours or days.

By distributing or balancing the operating time of the single transceivers, the lifetime or MTBF of the massive MIMO antenna may be greatly increased.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
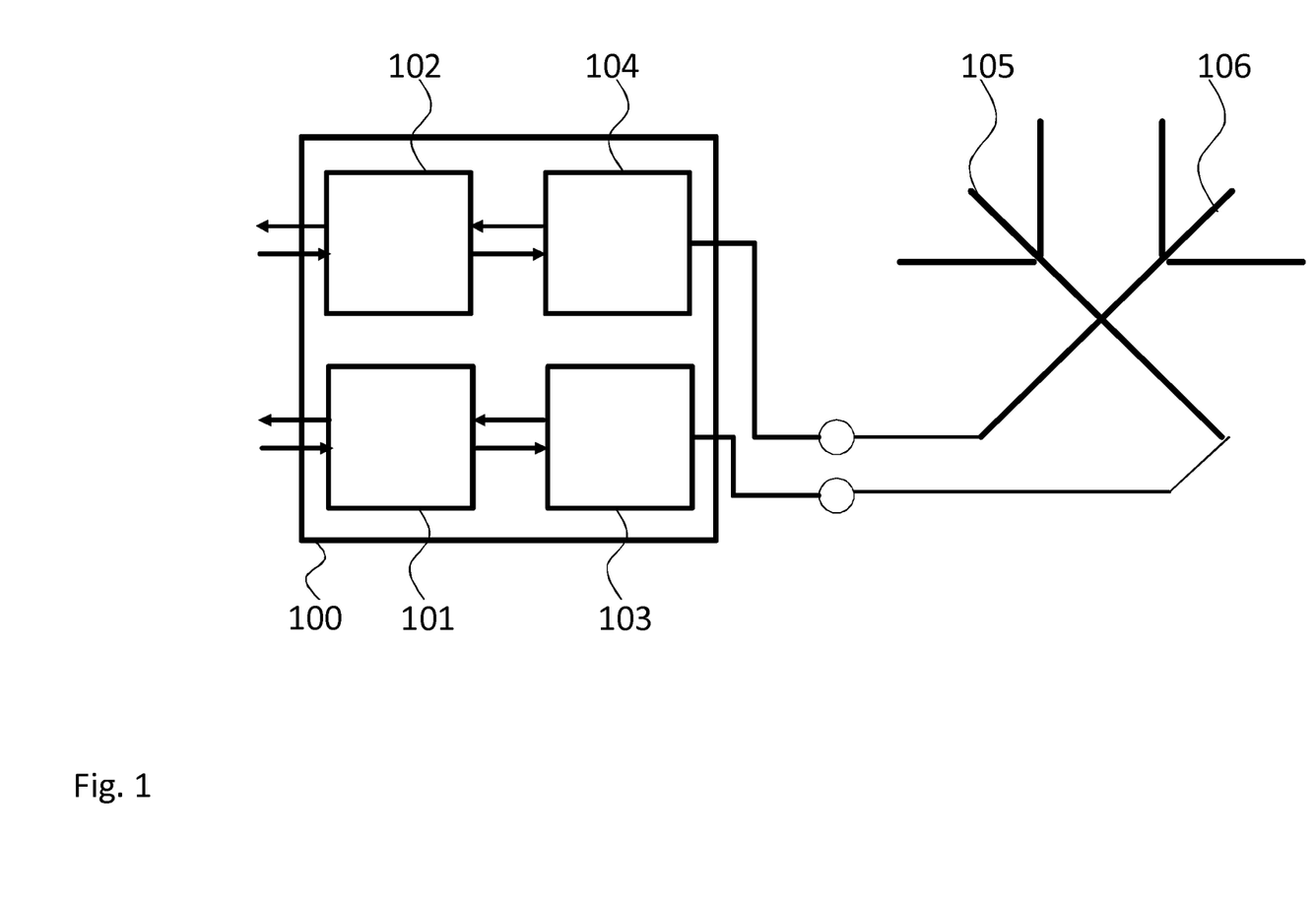
FIG. 1 shows a block diagram of an embodiment of a radio section for an embodiment of a massive MIMO antenna according to the present invention.

FIG. 1 shows a radio section 100 for an embodiment of a massive MIMO antenna that is coupled to two cross polarized antenna elements 105, 106. Although in FIG. 1 the radio section 100 is coupled to two cross polarized antenna elements 105, 106, it is understood, that a single radio section 100 may also be coupled to a group, e.g. two or four of cross polarized antenna elements in other embodiments.

The radio section 100 comprises for each of the cross polarized antenna elements 105, 106 a transceiver 101, 102 and a radio frontend 103, 104. It is understood, that in other embodiments, the radio frontends 103, 104 may be included in the transceivers 101, 102. Further, if in this document it is mentioned that a transceiver 101, 102 is deactivated or that an antenna element 105, 106 is deactivated, it is understood, that this may mean deactivating the respective transceiver 101, 102 and optionally also deactivating the elements of the radio frontend 103, 104, if this is provided as separate unit. Such elements may e.g. comprise filters, amplifiers and the like.

In embodiments, the radio section 100 may e.g. be provided as an integrated unit that comprises all the elements, as shown in FIG. 1. To deactivate a pair of cross polarized antenna elements 105, 106 the respective integrated unit radio section 100 may therefore be deactivated.

Deactivating a transceiver 101, 102 may refer to not providing any signals to the respective transceiver 101, 102 and/or the respective radio frontend 103, 104. In transmission direction this may e.g. be achieved by simply not providing any signals to the respective transceiver 101, 102 from a signal processing unit in the respective massive MIMO antenna. In the receiving direction, for example a switch may be provided between the respective antenna elements 105, 106 and the radio frontends 103, 104 to interrupt the signal lines between the antenna elements 105, 106 and the radio frontends 103, 104. As alternative, for example the power supply of the transceivers 101, 102 and/or the radio frontends 103, 104 may be turned off.

Figure 2:
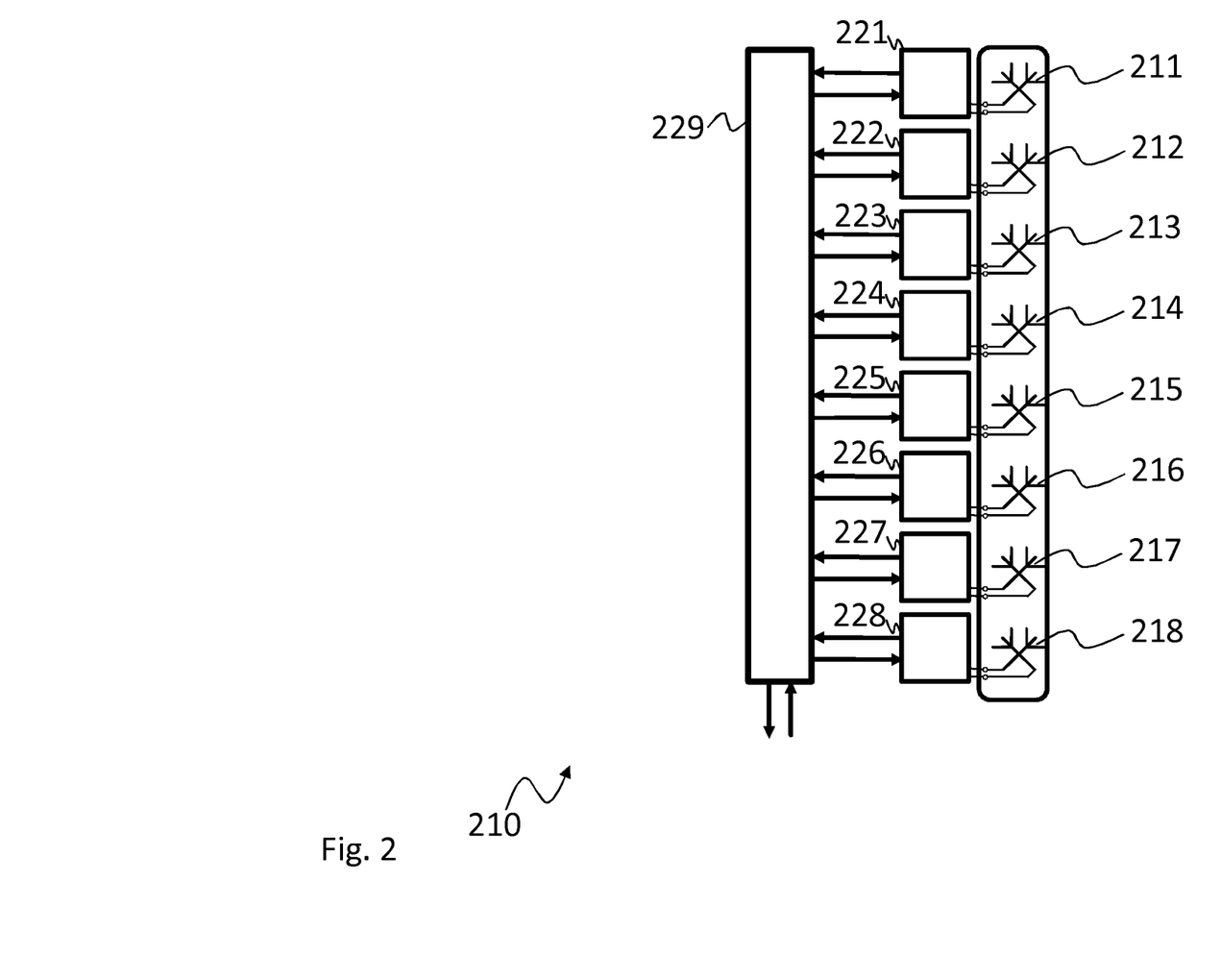
FIG. 2 shows a block diagram of an embodiment of a column of antenna elements and transceivers for an embodiment of a massive MIMO antenna according to the present invention.

FIG. 2 shows a column 210 of eight cross polarized antenna elements 211, 212, 213, 214, 215, 216, 217, 218 that may be used in an embodiment of a massive MIMO antenna according to the present invention. The column 210 comprises respective radio sections 221, 222, 223, 224, 225, 226, 227, 228 for each pair of the cross polarized antenna elements 211, 212, 213, 214, 215, 216, 217, 218.

In addition, the pairs of cross polarized antenna elements 211, 212, 213, 214, 215, 216, 217, 218 are coupled to a digital combiner 229. The digital combiner 229 may receive a single data stream from a control unit of the massive MIMO antenna and may provide multiple data streams to the radio sections 221, 222, 223, 224, 225, 226, 227, 228. In the opposite direction, the digital combiner 229 may receive multiple signals from the radio sections 221, 222, 223, 224, 225, 226, 227, 228 and combine them into a single signal that may be provided to a respective control unit.

It is understood, that the digital combiner 229 may provide each one of the radio sections 221, 222, 223, 224, 225, 226, 227, 228 with its dedicated signal to e.g. perform beam forming.

Although in FIG. 2 a column 210 for use in a massive MIMO antenna is shown, it is understood, that instead of columns 210 multiple rows may also be provided.

Figure 3:
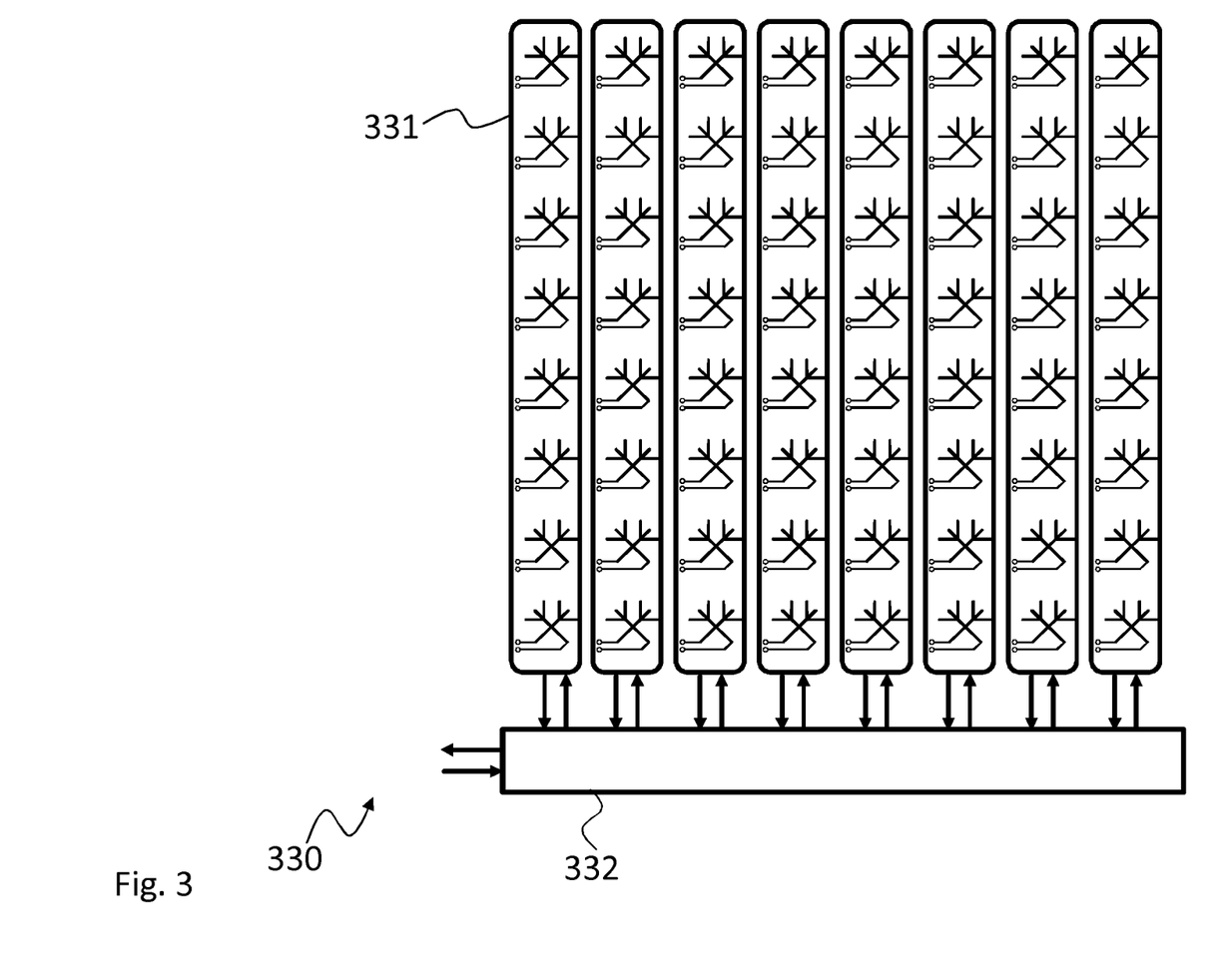
FIG. 3 shows a block diagram of an embodiment of a massive MIMO antenna according to the present invention.

FIG. 3 shows a massive MIMO antenna 330. The massive MIMO antenna 330 comprises eight columns 310 of pairs of cross polarized antenna elements. For sake of clarity only the first column is provided with a reference sign and the single antenna elements are not separately referenced. It is however understood, that the columns 310 may be columns as shown in FIG. 2.

The single columns are coupled to a common control unit 332 that perform signal processing for signals in transmission and receiving directions. The control unit 332 may in transmission direction e.g. receive digital signals via a data interface, like e.g. a CPRI or a X-RAN interface or the like, and provide the individual signals for the antenna elements to the single columns 331. In receiving direction, the control unit 332 may receive the incoming signals e.g. in digital form from the columns 331 and combine them into a signal that may e.g. be provided to a BBU via the CPRI or X-RAN interface.

In addition, the control unit 332 performs the activation and deactivation of the single transceivers or antenna elements. The control unit 332 may for example receive information about the transceivers that are to be deactivated via the data interface. In such an arrangement, for example a BBU may determine, which transceivers to deactivate.

As alternative, the control unit 332 may have functions incorporated that allow the control unit 332 to determine the amount of traffic or the load in the respective cell and control the transceivers respectively. In such an arrangement, part of the BBU or the complete BBU may be integrated into the massive MIMO antenna 330.

When deactivating single transceivers, the control unit 332 may deactivate groups of transceivers that refer to antenna elements of single columns 331 or rows in the matrix-like arrangement of antenna elements. It is understood, that the control unit 332 may also deactivate rows and columns of antenna elements. The control unit may e.g. provide a 4×4 antenna array by deactivating four columns and four rows of antenna elements of the massive MIMO antenna 330.

To reduce the total stress on the single transceivers and further electronic elements that are coupled to the single antenna elements, the control unit 332 may alternate between different transceivers in predetermined intervals. This means, that e.g. for providing a 4×8 antenna array with four columns and eight rows, the control unit 332 may e.g. deactivate the four left columns for the duration of the predetermined interval and, then after the predetermined time interval deactivate the four right columns while activating the four left columns of antenna elements. The stress or operation time will therefore be divided by two for the single transceivers.

The control unit 332 may e.g. comprise a memory and store the operation times for the single transceivers in that memory to easily determine, which of the transceivers should be deactivated.

It is understood, that in case that the full capacity of the massive MIMO antenna 330 is required, the control unit 332 may operate all of the transceivers.

Figure 4:
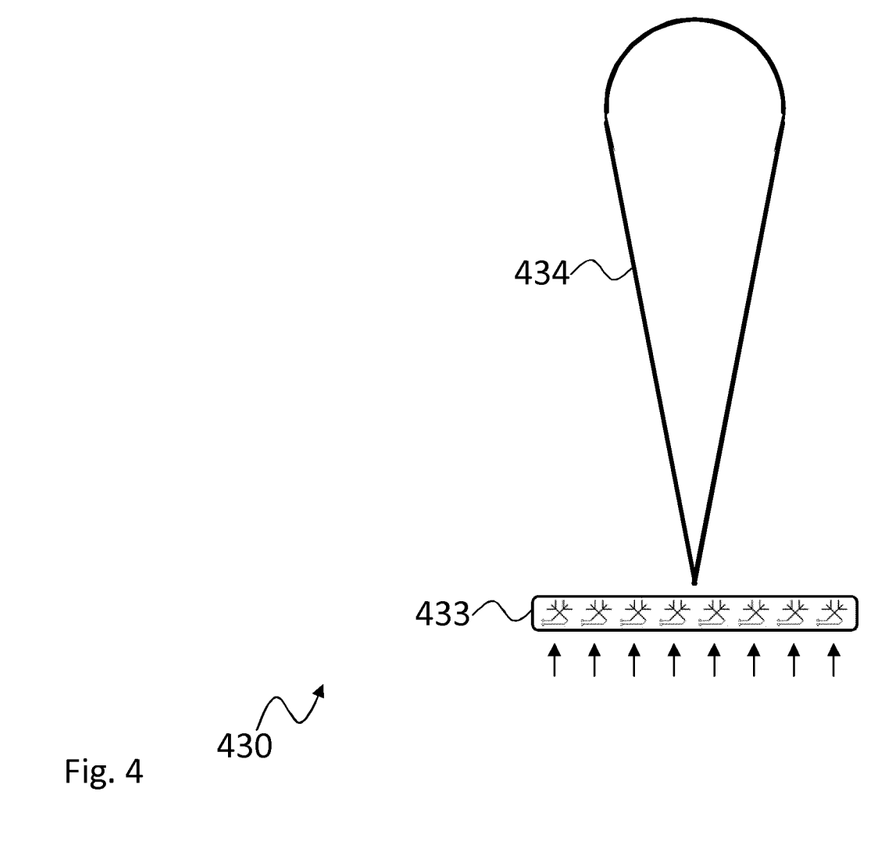
FIG. 4 shows a block diagram of another embodiment of a massive MIMO antenna according to the present invention.

FIG. 4 shows a massive MIMO antenna 430 in a top view with a single narrow beam 434 that is generated by said massive MIMO antenna 430. The massive MIMO antenna 430 is based on massive MIMO antenna 330 and therefore also comprises an antenna array 433 with eight columns of antenna elements.

A narrow beam 434 as it is shown may be created by the massive MIMO antenna 430 using all columns of antenna elements for performing the beamforming. It is understood, that the massive MIMO antenna 430 may provide multiple beams at once, although for sake of clarity only one beam 434 is shown.

This is the configuration of the massive MIMO antenna 430 that may be used under normal operating conditions, i.e. when the full capacity is required in a cell.

Figure 5:
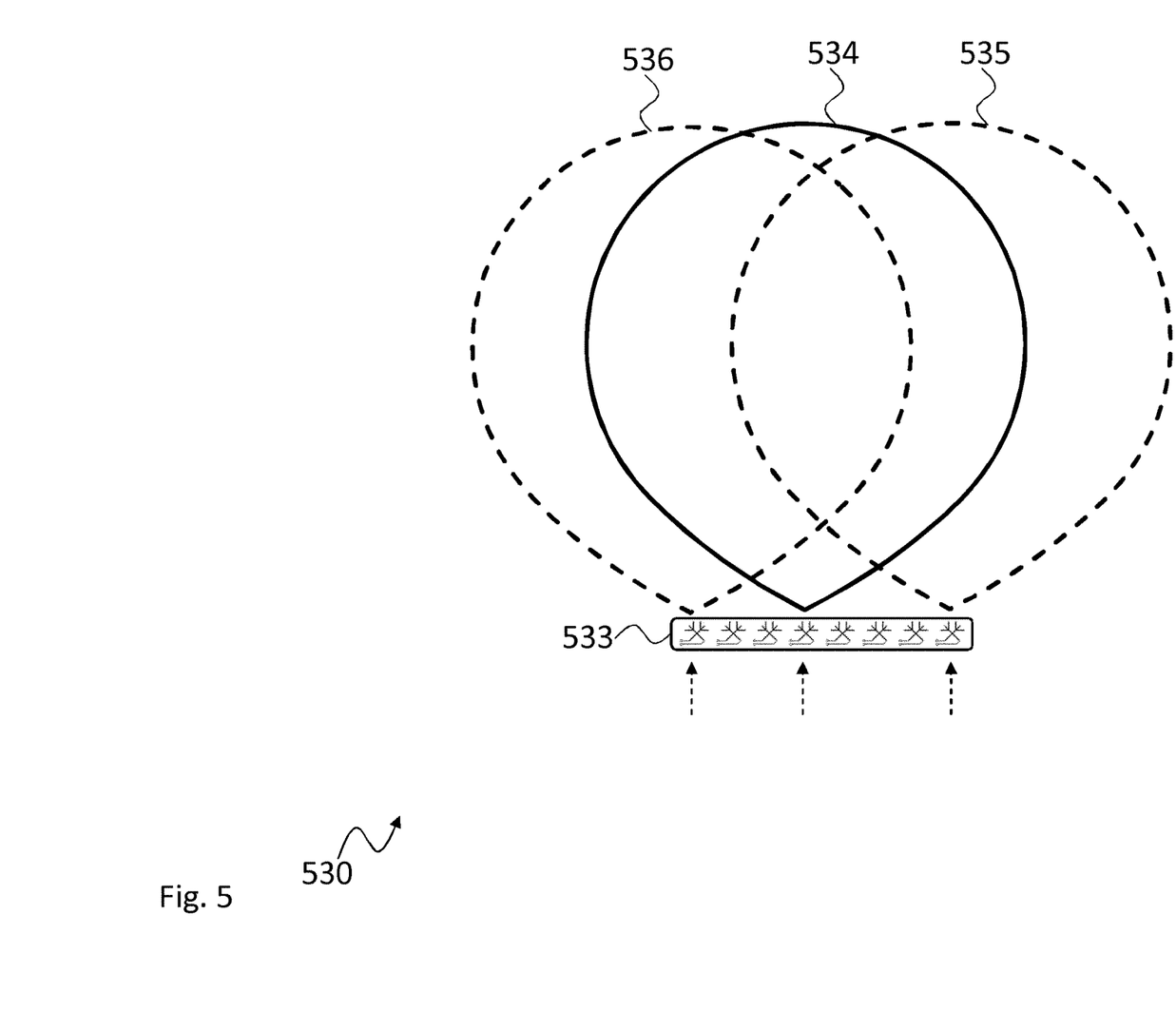
FIG. 5 shows a block diagram of another embodiment of a massive MIMO antenna according to the present invention.

FIG. 5 shows a massive MIMO antenna 530. The massive MIMO antenna 530 is based on the massive MIMO antenna 430 and therefore also comprises an antenna array 533 with eight columns antenna elements.

In contrast to the massive MIMO antenna 430 in the massive MIMO antenna 530 only a single column of antenna elements is active. It can be seen, that this results in a broad beam 534 as it is also provided by non-active antennas. It is obvious, that with a single broad beam 534 the capacity of the cell is smaller than with multiple narrow beams 434 as shown in FIG. 4. However, the achievable capacity may still suffice to provide the capacity required during low-demand periods, like e.g. during the night.

In FIG. 5 it can also be seen, how the control unit in the massive MIMO antenna 530 may periodically switch the active column of antenna elements. For example, the control unit may start with activating the first right column providing beam 535 and then periodically switch to the next column of antenna arrays until the left column is activated providing beam 536. Then the right column may be activated again.

Figure 6:
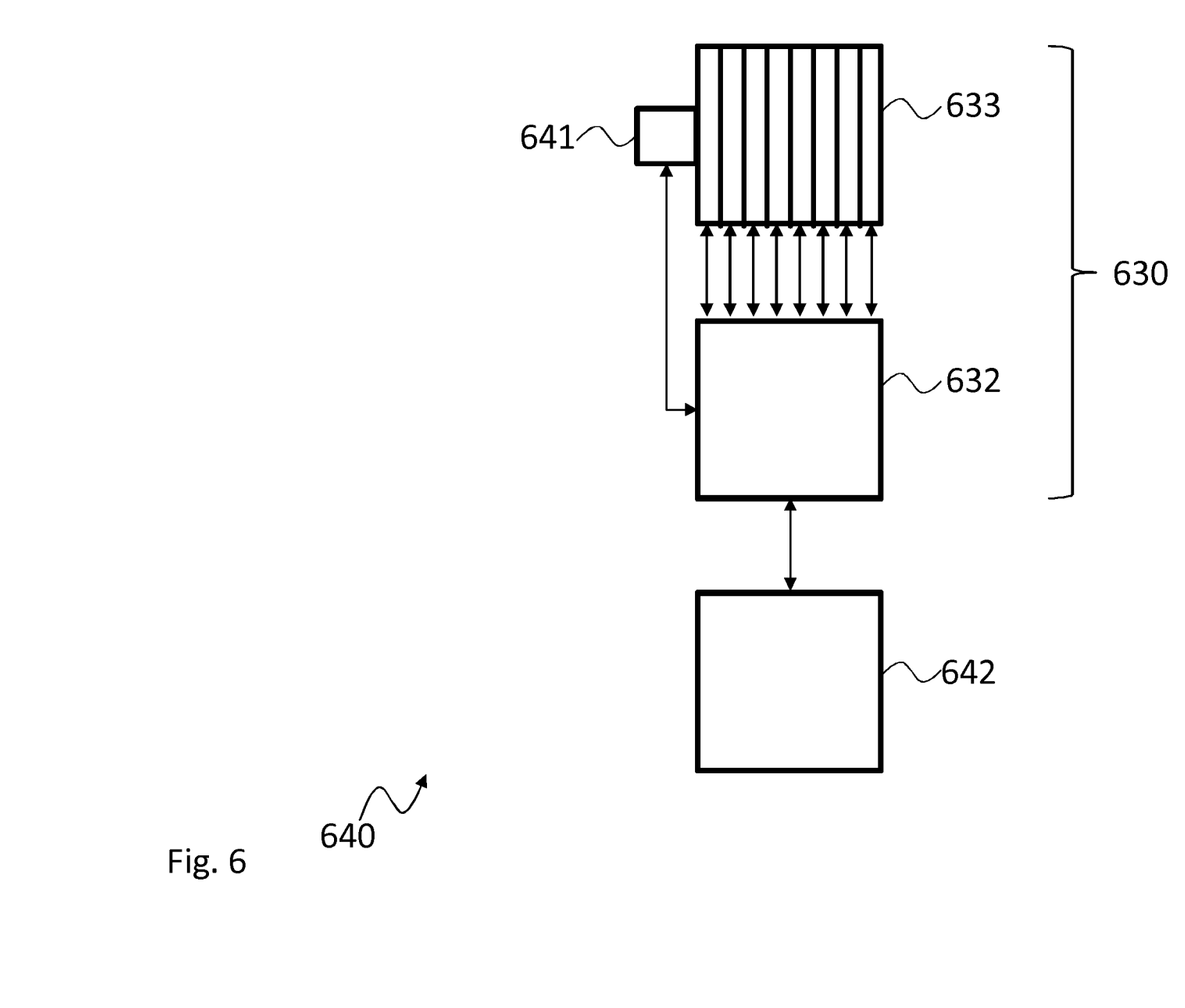
FIG. 6 shows a block diagram of an embodiment of a communication system according to the present invention.

FIG. 6 shows a communication system 640. The communication system 640 comprises a massive MIMO antenna 630 according to any of the above described embodiments. The massive MIMO antenna 630 comprises an antenna array 633, e.g. as shown in FIG. 3 that is coupled to a control unit 632. In addition, the massive MIMO antenna 630 comprises a temperature sensor 641 that is coupled to the control unit 632. The massive MIMO antenna 630 is coupled to a BBU 642, e.g. via a CPRI or X-RAN interface.

The temperature sensor 641 allows the control unit 632 to determine the temperature of the active elements, i.e. the transceivers and/or amplifiers, of the antenna array 633. Therefore, in case of excessive temperature in the antenna array 633, the control unit 632 may selectively deactivate single ones of the transceivers to reduce the generation of heat in the antenna array 633. It is understood, that the control unit 632 may also apply the above described sequence for alternatingly activating different transceivers in this case.

For sake of clarity in the following description of the method-based FIG. 7 the reference signs used above in the description of apparatus-based FIGS. 1-6 will be maintained.

Figure 7:
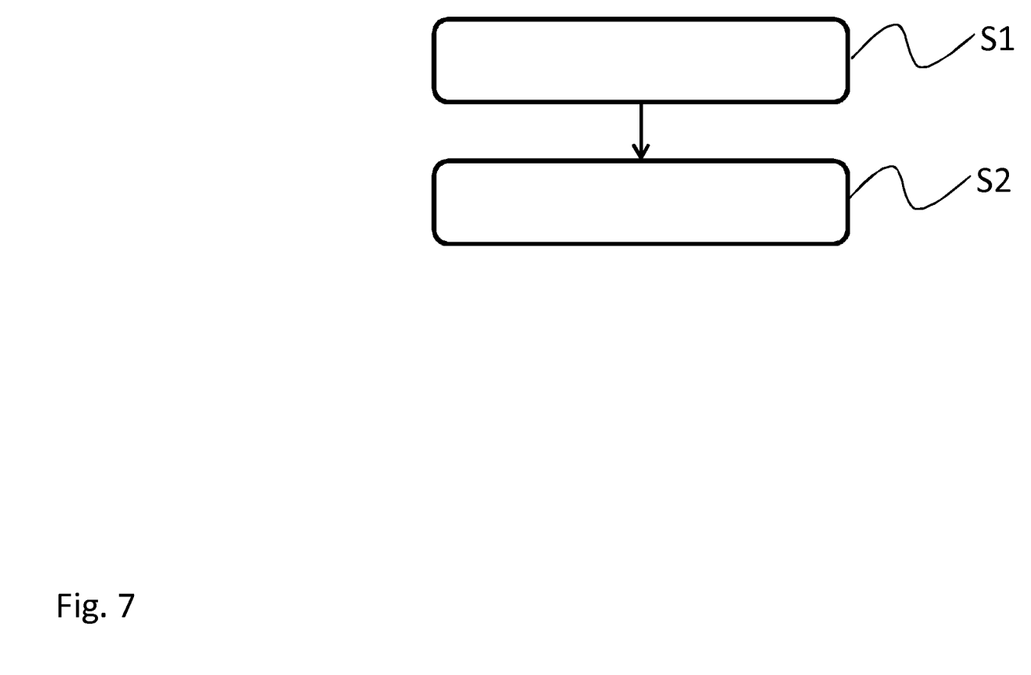
FIG. 7 shows a flow diagram of an embodiment of a method according to the present invention.

FIG. 7 shows a flow diagram of a method for operating a massive MIMO antenna 330, 430, 530, 630.

The method comprises initiating S1 operation of a plurality of transceivers 101, 102, each transceiver 101, 102 being coupled to at least one antenna element 105, 106, 211, 212, 213, 214, 215, 216, 217, 218 of a plurality of antenna elements 105, 106, 211, 212, 213, 214, 215, 216, 217, 218 configured to receive upstream wireless signals and to transmit downstream wireless signals, the antenna elements 105, 106, 211, 212, 213, 214, 215, 216, 217, 218 being arranged in a matrix-like arrangement comprising rows and/or columns 210, 331 of antenna elements 105, 106, 211, 212, 213, 214, 215, 216, 217, 218, and during operation of the transceivers 101, 102 selectively activating and/or deactivating S2 specific ones of the transceivers 101, 102.

When selectively activating and/or deactivating, the transceivers 101, 102 that are coupled to the antenna elements 105, 106, 211, 212, 213, 214, 215, 216, 217, 218 of a specific row and/or column 210, 331 of the matrix-like arrangement are selectively activated and/or deactivated in groups. This means that either rows or columns or rows and columns of antenna elements 105, 106, 211, 212, 213, 214, 215, 216, 217, 218 may be deactivated or activated.

The transceivers 101, 102 may for example be selectively activated and/or deactivated based on a load condition of the massive MIMO antenna 330, 430, 530, 630. To this end, the number of selectively activated and/or deactivated transceivers 101, 102 may e.g. gradually be determined based on a load condition of the massive MIMO antenna 330, 430, 530, 630.

To determine the load condition, activation information may be received via a control interface, e.g. from a base band unit. The transceivers 101, 102 may then be selectively activated and/or deactivated based on the activation information. In addition, or as alternative, a load information may be determined for the massive MIMO antenna 330, 430, 530, 630 and the transceivers 101, 102 may be selectively activated and/or deactivated based on the determined load information.

The method may further comprise sensing the temperature in the massive MIMO antenna 330, 430, 530, 630 with at least one temperature sensor 641, and selectively activating and/or deactivating the transceivers 101, 102 based on the measured temperature.

In order to evenly distribute stress over all transceivers 101, 102, the method may also comprise storing the operating time of the single transceivers 101, 102 and selectively activating and/or deactivating the transceivers 101, 102 based on the stored operating time.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

The present invention provides a massive MIMO antenna 330, 430, 530, 630 for wireless communication, the massive MIMO antenna 330, 430, 530, 630 comprising a plurality of antenna elements 105, 106, 211, 212, 213, 214, 215, 216, 217, 218 configured to receive upstream wireless signals and to transmit downstream wireless signals, the antenna elements 105, 106, 211, 212, 213, 214, 215, 216, 217, 218 being arranged in a matrix-like arrangement comprising rows and/or columns 210, 331 of antenna elements 105, 106, 211, 212, 213, 214, 215, 216, 217, 218, a plurality of transceivers 101, 102, each coupled to at least one of the antenna elements 105, 106, 211, 212, 213, 214, 215, 216, 217, 218, and a control unit 332, 632 configured to selectively activate and/or deactivate specific ones of the transceivers 101, 102. In addition, the present invention provides a respective method for operating a massive MIMO antenna 330, 430, 530, 630.

LIST OF REFERENCE SIGNS 100 radio section
101, 102 transceiver
103, 104 radio frontend
105, 106 antenna element
210 column
211, 212, 213, 214, 215, 216, 217, 218 cross polarized antenna elements
221, 222, 223, 224, 225, 226, 227, 228 radio section
229 digital combiner
330, 430, 530, 630 massive MIMO antenna
331 column
332, 632 control unit
433, 533, 633 antenna array
434, 534, 535, 536 beam
640 communication system
641 temperature sensor
642 base band unit
S1, S2 method steps

The invention claimed is:

1. Massive multiple-input, multiple-output (MIMO) antenna for wireless communication, the massive MIMO antenna comprising:
- a plurality of antenna elements configured to receive upstream wireless signals and to transmit downstream wireless signals, the antenna elements being arranged in a matrix-like arrangement comprising rows and/or columns of antenna elements,
- a plurality of transceivers each coupled to at least one of the antenna elements, and
- a control unit configured to selectively activate and/or deactivate specific ones of the transceivers, the control unit configured to store the operating time of the single transceivers and to selectively activate and/or deactivate the transceivers based on the stored operating time.

2. The massive MIMO antenna according to claim 1, wherein the control unit is configured to selectively activate and/or deactivate in groups the transceivers that are coupled to the antenna elements of a specific row and/or column of the matrix-like arrangement.

3. The massive MIMO antenna according to claim 1, wherein the control unit is configured to selectively activate and/or deactivate the transceivers based on a load condition of the massive MIMO antenna.

4. The massive MIMO antenna according to claim 3, wherein the control unit is configured to gradually determine the number of selectively activated and/or deactivated transceivers based on a load condition of the massive MIMO antenna.

5. The massive MIMO antenna according to claim 1, wherein the control unit comprises a control interface that is configured to receive activation information and to selectively activate and/or deactivate the transceivers based on the activation information.

6. The massive MIMO antenna according to claim 1, wherein the control unit is configured to determine a load information for the massive MIMO antenna and to selectively activate and/or deactivate the transceivers based on the determined load information.

7. The massive MIMO antenna according to claim 1, wherein the control unit comprises at least one temperature sensor configured to measure a temperature inside of the massive MIMO antenna, and wherein the control unit is configured to selectively activate and/or deactivate the transceivers based on the measured temperature.

8. Method for operating a massive multiple-input, multiple-output (MIMO) antenna, the method comprising:
    initiating (S1) operation of a plurality of transceivers, each transceiver being coupled to at least one antenna element of a plurality of antenna elements configured to receive upstream wireless signals and to transmit downstream wireless signals, the antenna elements being arranged in a matrix-like arrangement comprising rows and/or columns of antenna elements,
    during operation of the transceivers selectively activating and/or deactivating (S2) specific ones of the transceivers; and
    storing the operating time of the single transceivers and selectively activating and/or deactivating the transceivers based on the stored operating time.

9. The method according to claim 8, wherein when selectively activating and/or deactivating, the transceivers that are coupled to the antenna elements of a specific row and/or column of the matrix-like arrangement are selectively activated and/or deactivated in groups.

10. The method according to claim 8, wherein the transceivers are selectively activated and/or deactivated based on a load condition of the massive MIMO antenna.

11. The method according to claim 10, wherein the number of selectively activated and/or deactivated transceivers is gradually determined based on a load condition of the massive MIMO antenna.

12. The method according to claim 8, wherein activation information is received via a control interface and the transceivers are selectively activated and/or deactivated based on the activation information.

13. The method according to claim 8, comprising sensing the temperature in the massive MIMO antenna with at least one temperature sensor, and selectively activating and/or deactivating the transceivers based on the measured temperature.

14. The method according to claim 8, wherein a load information is determined for the massive MIMO antenna and the transceivers are selectively activated and/or deactivated based on the determined load information.

15. The method according to claim 11, comprising:
    sensing the temperature in the massive MIMO antenna with at least one temperature sensor, and
    selectively activating and/or deactivating the transceivers based on the measured temperature.

16. The massive MIMO antenna according to claim 4, wherein the control unit comprises a control interface that is configured to receive activation information and to selectively activate and/or deactivate the transceivers based on the activation information.

17. The massive MIMO antenna according to claim 4, wherein the control unit is configured to determine a load information for the massive MIMO antenna and to selectively activate and/or deactivate the transceivers based on the determined load information.

\* \* \* \* \*